April 21, 1970     W. J. HAYNES, JR., ET AL     3,507,471
LOW PROFILE HOLD-DOWN UNIT FOR CARGO Filed Feb. 19, 1968     2 Sheets-Sheet 2

INVENTORS.
William J. Haynes Jr.
Tommy W. Martin

BY Schmidt, Johnson, Hovey,
Williams & Bradley
ATTORNEYS.

April 21, 1970   W. J. HAYNES, JR., ET AL   3,507,471
LOW PROFILE HOLD-DOWN UNIT FOR CARGO
Filed Feb. 19, 1968   2 Sheets-Sheet 1

INVENTORS.
William J. Haynes Jr.
Tommy W. Martin

BY Schmidt, Johnson, Hovey,
Williams & Bradley.
ATTORNEYS.

United States Patent Office 3,507,471
Patented Apr. 21, 1970

3,507,471
LOW PROFILE HOLD-DOWN UNIT FOR CARGO
William J. Haynes, Jr., Shawnee Mission, and Tommy W. Martin, Kansas City, Kans., assignors to The Darby Corporation, Kansas City, Kans., a corporation of Kansas
Filed Feb. 19, 1968, Ser. No. 706,483
Int. Cl. B65j 1/22
U.S. Cl. 248—361                      3 Claims

ABSTRACT OF THE DISCLOSURE

A low profile unit for securing cargo to the deck of a conveyance for transportation includes a rotor assembly lying flatly on the deck of a railway car or the like and rotating about a vertical axis. The chain or other flexible lashing extends upwardly from such assembly at an angle for connection with the automobile or other cargo to be held down. Slack in the chain may be taken up either by shifting the assembly itself along a track having racks engaged by a pair of intermeshed ratchet wheels or by running the chain over a rotor that has pockets for receiving the links of the chain. In each embodiment a ratchet and pawl unit prevents retrograde rotation.

Many types of tie-down devices have been successfully used to lash automobiles to the decks of railway cars such as the assembly disclosed, for example, in U.S. Letters Patent No. 3,120,375, issued to the assignee hereof on Feb. 4, 1964. Since the lashing chain of such prior art disclosure wraps around a horizontally rotating winch drum, the height of the unit necessitates considerable clearance between the automobile frame and the railway deck to which the tie-down unit is attached. However, many deck constructions do not leave sufficient clearance for the conventional tie-down.

It is the primary object of the present invention, therefore, to provide a tie-down that consumes very little vertical space but is nonetheless capable of meeting all other requirements of such devices including reliability, strength, ease of handling and inexpensive manufacture.

Figure 5:
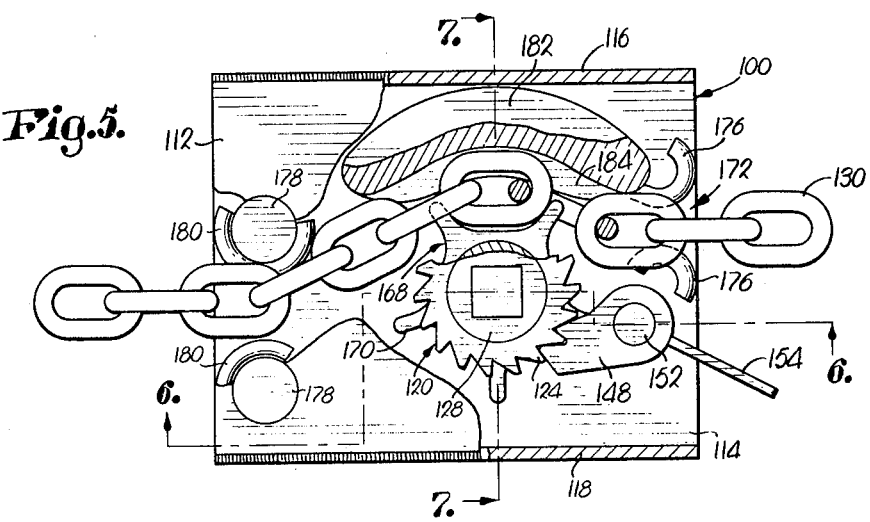
FIG. 5 is a plan view of a modified form of the instant invention, parts being broken away and in section to reveal details of construction.
Figure 6:
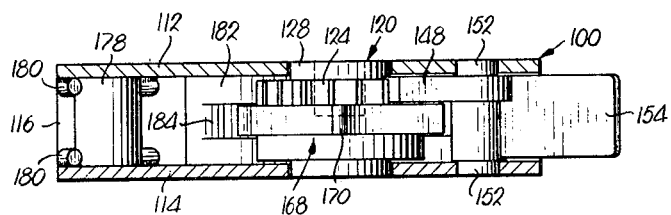
FIG. 6 is a cross-sectional view taken on irregular line 6—6 of FIG. 5 but showing only the upper and lower plates in section.
Figure 7:
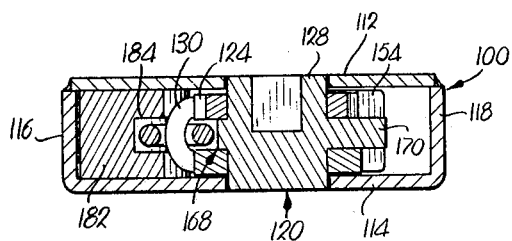
FIG. 7 is a cross-sectional view taken on line 7—7 of FIG. 5.
Figure 8:
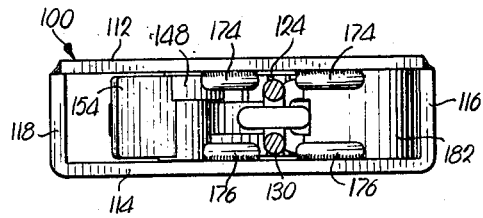
FIG. 8 is an end view showing the entrance mouth for the chain.
Figure 9:
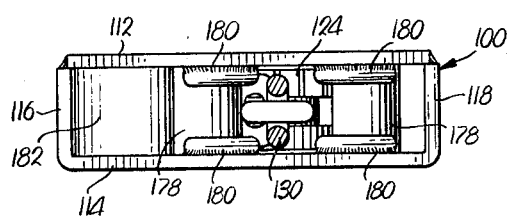
FIG. 9 is a view showing the opposite end of the embodiment of FIGS. 5–8.
Figure 1:
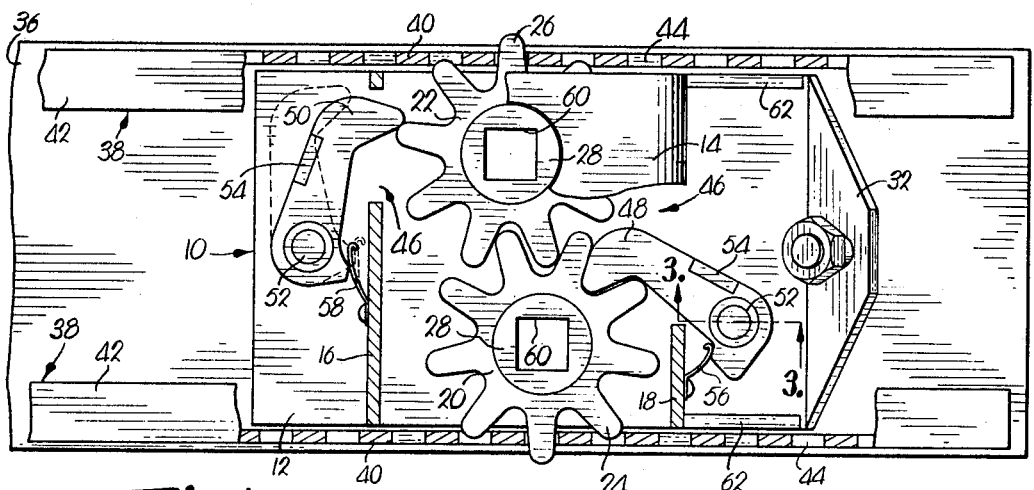
FIGURE 1 is a plan view of a low profile hold-down unit for cargo embodying one form of the instant invention, parts being broken away and in section for clearness.
Figure 2:
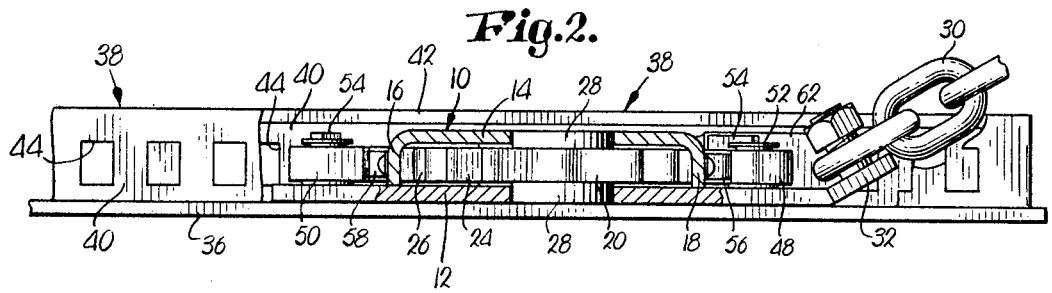
FIG. 2 is a side elevational view thereof, parts being broken away and in section to reveal details of construction.

In the embodiment of FIGS. 1–4, unit 10 includes a pair of plates 12 and 14, the latter having downturned ends 16 and 18 rigid to plate 12. A pair of rotors 20 and 22 between plates 12 and 14, having intermeshing ratchet teeth 24 and 26 respectively, are provided with hubs 28 journalled in plates 12 and 14 for rotation about vertical axes. A flexible lashing 30, such as a chain, is connected to upturned end 32 of plate 12 for connection with cargo, such as a vehicle 34, to be held down on deck 36 of a railway car or other conveyance.

A pair of parallel, horizontal racks 38, welded or otherwise affixed to deck 36, receive the unit 10 between vertical legs 40 and beneath horizontal legs 42 thereof. Each leg 40 has a longitudinal series of equally spaced openings 44 which receive corresponding teeth 24 and 26.

Ends 16 and 18 have clearance openings 46 for pawls 48 and 50 that are swingable on plate 12 about pintles 52 and provided with finger tabs 54 to permit disengagement from teeth 24 and 26 respectively against the action of corresponding springs 56 and 58.

Figure 4:
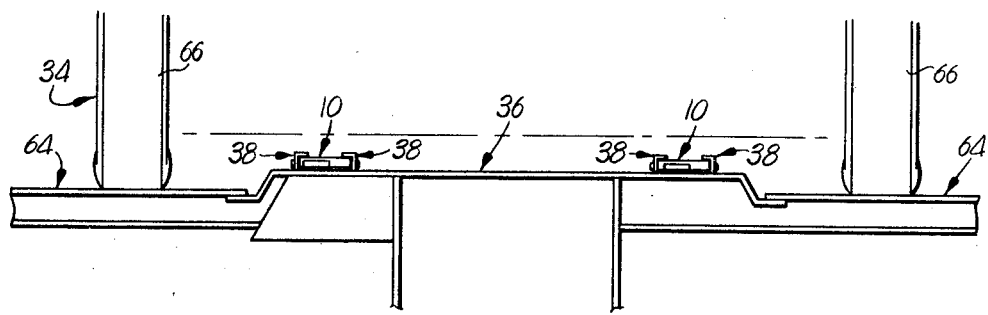
FIG. 4 is a fragmentary end view of a vehicle on the deck of a railway car showing the disposition of the unit when placed in use.
Figure 3:
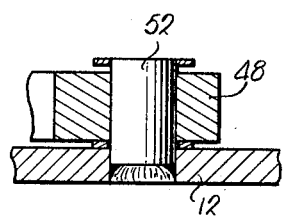
FIG. 3 is an enlarged, fragmentary cross-sectional view taken on line 3—3 of FIG. 1.

Openings 60 in hubs 28 receive any suitable hand tool to permit rotation of rotors 20 and 22. Projections 62 on plate 12 engageable with legs 42 prevent upward bending of plate 12. FIG. 4 illustrates the low profile of the two assemblies, permitting use where space availability is at a premium for any reason, such as the recessed supports 64 of deck 36 for wheels 66.

In operation, the slack in chain 30 is taken up by rotating one of the rotors 20 or 22 in one direction. This causes the rotors 20 and 22 to advance along racks 38, clicking the pawls 48 and 50 which alternate in holding the unit 10 against retrograde movement. Each increment of movement of unit 10 is decreased by one-half through such alternate action of pawls 48 and 50.

In FIGS. 5–9, unit 100 has plates 112 and 114 joined by the upturned sides 116 and 118 of plate 114. A rotor 120 having ratchet teeth 124 has a hub 128 journalled in plates 112 and 114 therebetween for rotation about a vertical axis. A flexible lashing 130, such as a chain, for connection with the cargo, passes through the unit 100 between plates 112 and 114.

A pawl 148, which may be spring-loaded if desired, is swingable between plates 112 and 114 about pintles 152 and has a finger tab 154 to permit disengagement from ratchet teeth 124 of rotor 120. An opening 160 in hub 128 receives a hand tool for rotating rotor 120.

Rotor 120 has pockets 168 receiving alternate links of chain 130, the adjacent links receiving fingers 170 which define pockets 168. The entrance mouth 172 for chain 130 has a pair of spaced, arcuate, upper chain guides rigid to plate 112 and a pair of similar chain guides 176 on plate 114. As chain 130 emerges from between plates 112 and 114 it is guided between rods 178 interconnecting plates 112 and 114 and between arcuate guides 180 on rods 178.

Chain 130 is also guided and held in pockets 168 by a block 182 between plates 112 and 114 having an arcuate longitudinal chain receiving slot 184.

In operation, after chain 130 is attached to the cargo, and assuming that unit 100 is secured to deck 36, rotation of rotor 120 counterclockwise, viewing FIG. 5, takes up the slack in chain 130. If desired, unit 100 may be attached to deck 36 for movement therealong in any suitable manner, as for example, through use of the construction shown and described in the above-mentioned Patent No. 3,120,375.

Having thus described the invention, what is claimed as new and desired to be secured by Letters Patent is:

1. A low profile assembly for securing cargo to the deck of a conveyance for transportation, said assembly comprising:
    a rotor;
    structure supporting said rotor for rotation about an upright axis;
    said structure being attachable to said deck;

a flexible lashing adapted for connection with said cargo;

means for taking up the slack in said lashing upon rotation of said rotor in one direction; and releasable means engageable with said rotor for holding the latter against retrograde rotation, said lashing being attached to said structure, there being a horizontal rack rigid to the deck, said rotor having ratchet teeth at its periphery meshing with said rack for shifting said structure away from the cargo during rotation of the rotor in said one direction, there being a second toothed rotor in mesh with the first mentioned rotor and mounted on said structure for rotation about an axis in spaced parallelism to said upright axis, and a second rack rigid to the deck in spaced parallelism to said first mentioned rack and meshing with the teeth of said second rotor, said structure being disposed between the racks.

2. The invention of claim 1, and a second releasable means engageable with the teeth of said second rotor for holding the latter against retrograde rotation, each releasable means comprising a pawl, said pawls being disposed to alternately hold the rotors against retrograde rotation whereby to reduce the extent of incremental movement of said structure along the racks.

3. A low profile assembly for securing cargo to the deck of a conveyance for transportation, said assembly comprising:

a rotor;

structure supporting said rotor for rotation about an upright axis, said structure being attachable to said deck;

a flexible lashing adapted for connection with said cargo;

means for taking up the slack in said lashing upon rotation of said rotor in one direction; and releasable means engageable with said rotor for holding the latter against retrograde rotation, said rotor having ratchet teeth at its periphery, said releasable means comprising a pawl swingably carried by at least one of said plates and engageable with said teeth, said lashing being attached to the lowermost of said plates, there being a pair of parallel, horizontally spaced, horizontal racks rigid to the deck and disposed to receive said structure therebetween, said plates having a second toothed rotor disposed therebetween and mounted thereon for rotation about an axis parallel to the axis of rotation of said first mentioned rotor, the teeth of the rotors intermeshing and being in mesh with corresponding racks for shifting said structure away from the cargo during rotation of one of the rotors in one direction.

References Cited

UNITED STATES PATENTS

| | | | |
|---|---|---|---|
| 522,252 | 7/1894 | Garrison | 254—95 X |
| 1,472,538 | 10/1923 | Whalley | 254—95 X |
| 3,324,807 | 6/1967 | Broling | 105—369 |

CHANCELLOR E. HARRIS, Primary Examiner

U.S. Cl. X.R.

105—368, 369